A. NORDLUND.
PROCESS OF FORMING PIPE UNIONS.
APPLICATION FILED FEB. 17, 1919.
1,408,390.
Patented Feb. 28, 1922.
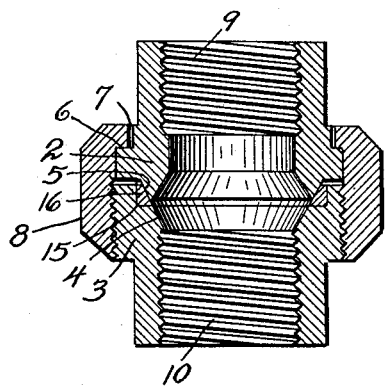
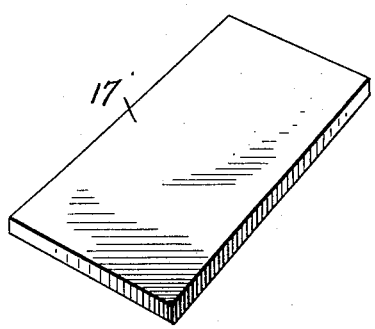
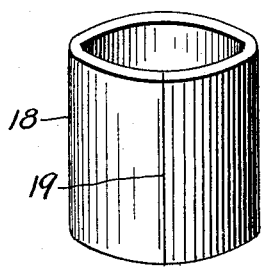
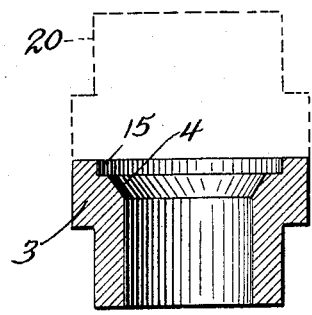
Inventor:
August Nordlund
Attorney

UNITED STATES PATENT OFFICE.

AUGUST NORDLUND, OF EVANSTON, ILLINOIS.

PROCESS OF FORMING PIPE UNIONS.

1,408,390.   Specification of Letters Patent.   Patented Feb. 28, 1922.

Application filed February 17, 1919. Serial No. 277,399.

*To all whom it may concern:*

Be it known that I, AUGUST NORDLUND, a citizen of the United States, residing at Evanston, Cook County, Illinois, have invented new and useful Improvements in Processes of Forming Pipe Unions, of which the following is a specification.

In the earlier stage of the art pipe unions were produced by the molding or casting process, which made the union, or coupling between pipe-lengths, weaker than the body of the pipe or conduit sections, with the result that strains which the pipe or conduit proper could resist caused the unions to give way.

This difficulty was then remedied by making pipe-unions of wrought iron, and by means of an improved process of stamping and turning operations on metal adapted to withstand such strains, or by making them of steel suitable to the same kind of operations. This cured the trouble of weakness at the coupling or union points of a conduit consisting of sections coupled together, but the improvement also entailed an additional cost of manufacture and limited the use of the improved unions to the industries or arts which could afford to use them and necessarily required their use, and this by reason that the unions required a grade of metal higher and more expensive than that which the connected pipe sections contained.

The object of the present invention is to make it possible to make the improved union, by means of a cheaper process.

In my present improvement the whole union is formed and welded from a blank consisting of a flat plate of metal by the "upsetting" process.

In the several accompanying views on the drawing hereto annexed—

Figure 1 represents a longitudinal section through a straight pipe union.

Figure 2 shows a plain rectangular blank cut from a flat bar as the initial form of my improvement and for which no novelty is claimed.

Figure 3 shows the Figure 2 blank formed into a cylinder, and Figure 4 shows this cylinder.

In Figures 1 and 4 the thickened portion of the male member of the union is represented by the numeral 2, while the similar thickened portion in the female member is indicated by the numeral 3. The latter is formed with an interior flared wall 4 which is engaged by an exteriorly tapered portion 5 on the male member as well known to the art. The male member has a projecting ledge or flange 6 that is engaged by an inwardly projecting flange 7 on a threaded collar 8 which has threaded engagement with exterior threads on the thickened portion 3. The interior threads for pipes connected by this union are indicated by numerals 9 and 10.

In the female member of the union is shown an annular recess 15 into which is pressed a brass ring 16 which is usually provided as a contact surface in the female member for engagement with the tapered portion 5 of the male member. After each operation the structure must be annealed to enable it to withstand the next operation. In my improved and greatly shortened process the union member is heated and then upset and at the same time formed, including welding, in the holding die to provide in the thickened or upset portion the required flange and other configurations, such as the annular recess 15 for the bearing-ring 16. Therefore no separate heating is required for the insertion of the ring 16. The operations are thus reduced to three or four, namely, heating, upsetting, forming with a weld and inserting the ring 16. The remaining operations, such as cutting threads on the coupling members, are the same in connection with the present as with prior processes. The comparatively few steps of my process are substantially shown in Figures 2, 3 and 4 where the blank is of a rectangular form 17, said blank being turned into a cylinder 18 the ends of which are joined or welded at 19 and compressed by a die represented by the dotted lines 20, to produce the finished form shown in Figures 1 to 4.

Having thus described my invention, I claim as new and desire to secure by Letters Patent—

1. The process of forming a pipe union member which comprises applying welding heat to a rectangular blank bent into cylindrical form and during said heat, or before said blank has cooled from same, forming up, welding the ends and upsetting said blank into the form of a pipe-union.

2. The method of forming a pipe-union member which consists of heating and welding a plate of metal curved into cylindrical form, and, during the same welding heat, welding together the ends of said blank to make said cylinder an unbroken ring and at the same time compressing one end of the cylinder to increase its thickness and diameter.

3. The method of forming a pipe union male or female member, comprising the cutting of a substantially rectangular blank from sheet metal, heating and bending said blank to form an annulus with ends joined at 19, then during the same heat, thickening one end of the annulus and welding its edges at 19.

4. The method of forming a pipe union member, which consists of cutting a rectangular blank of sheet metal, bending the blank to form an annulus, then during a single heating of said annulus welding the ends of the blank to each other, thickening its walls and expanding one end of the annulus to increase its diameter, the same operation forming the seat for the companion member or its seat ring and the exterior polygonal wrench-hold contour of said member.

In testimony whereof I have hereunto signed my name.

AUGUST NORDLUND.